United States Patent [19]

Miachon

[11] 4,220,279
[45] Sep. 2, 1980

[54] INSTALLATION FOR THE CENTRIFUGAL EXTRACTION OF ONE LIQUID BY ANOTHER

[75] Inventor: Jean-Paul Miachon, Lyons, France

[73] Assignee: Robatel, S.L.P.I., Genas, France

[21] Appl. No.: 11,593

[22] Filed: Feb. 12, 1979

[30] Foreign Application Priority Data

Feb. 15, 1978 [FR] France .................... 78 04986

[51] Int. Cl.³ .................................... B04B 3/00
[52] U.S. Cl. ................................ 233/3; 233/44
[58] Field of Search ............... 233/3, 4 R, 6–8, 233/14 R, 15, 44–46

[56] References Cited

U.S. PATENT DOCUMENTS

| 1,882,389 | 10/1932 | MacIsaac | 233/3 |
| 2,881,974 | 4/1959 | Ruf | 233/45 |
| 3,756,505 | 9/1973 | Miachon | 233/3 |

FOREIGN PATENT DOCUMENTS

| 504897 | 5/1971 | Switzerland | 233/3 |
| 580872 | 11/1977 | U.S.S.R. | 233/3 |

Primary Examiner—Leonard D. Christian
Attorney, Agent, or Firm—Dowell & Dowell

[57] ABSTRACT

In an installation for the centrifugal extraction of one liquid by another, of the type comprising a series of elementary machines in each of which two non-miscible liquids are conducted through a common pump, then they are separated by centrifugation and are collected in two separate collector spaces, these two liquids passing through the installation in opposite directions, at least one of the liquids leaving at least one of the machines is transferred into the collector space of the other liquid in another machine of the series.

10 Claims, 4 Drawing Figures

INSTALLATION FOR THE CENTRIFUGAL EXTRACTION OF ONE LIQUID BY ANOTHER

The present invention relates to installations comprising a series of elementary machines in each of which are conducted two non-miscible liquids through a common pump, then they are separated by centrifugation and are collected in two separate collector spaces. By circulating the two liquids in opposite directions through the succession of these machines (so-called "counter-current" system), one of said liquids absorbs, by solution or otherwise, certain substances contained in the other and which it is desired to eliminate or recover.

Known installations of the type in question have the drawback that the bringing into contact of the liquids with each other in the course of each of the successive phases of the treatment is of very short duration, which may lead to insufficient results. In fact, even if the liquids are conducted to each machine by means of a common pipe, since they are not miscible, they tend to form separate streams, this leading to a much reduced contact surface. It is only in the pump that an intimate contact occurs between the two liquids. Unfortunately, the passage through the pump is very rapid and immediately after said passage the liquids are separated by the centrifugal force.

It is an object of the present invention to considerably increase the duration of the intimate contact of the two liquids in each stage of the installation, thus improving the final result and possibly enabling the number of stages, i.e. of elementary machines, to be reduced, whilst obtaining the same degree of extraction.

In accordance with the invention, at least one of the liquids leaving at least one of the machines is transferred into the collector space for the other liquid in another machine of the series.

Because of the fact that the liquid which leaves the centrifugation bowl of the second machine reaches the machine's collector space in the finely divided state, it will be understood that the mixture of the two liquids in this space involves a considerable mutual contact surface area. In fact, a sort of emulsion of the liquids leaving the bowl to be transferred from the collector space of the first machine, or vice versa, tends to be formed in the space. Even if this emulsion does not last a long time, it suffices to ensure a relatively long time of contact inside the collector space of the second machine, and subsequently in the evacuation pipe thereof.

To ensure the transfer between the collector spaces of the two machines without having to provide auxiliary pumps, advantage may be taken in particular of the fact that, in the machines of the type in question, the collector spaces are generally disposed at different levels, with the result that starting from the upper collector space of the first machine, the liquid may flow by gravity into the lower collector space of the second machine.

The invention will be more readily understood on reading the following description with reference to the accompanying drawings, in which.

Figure 1:
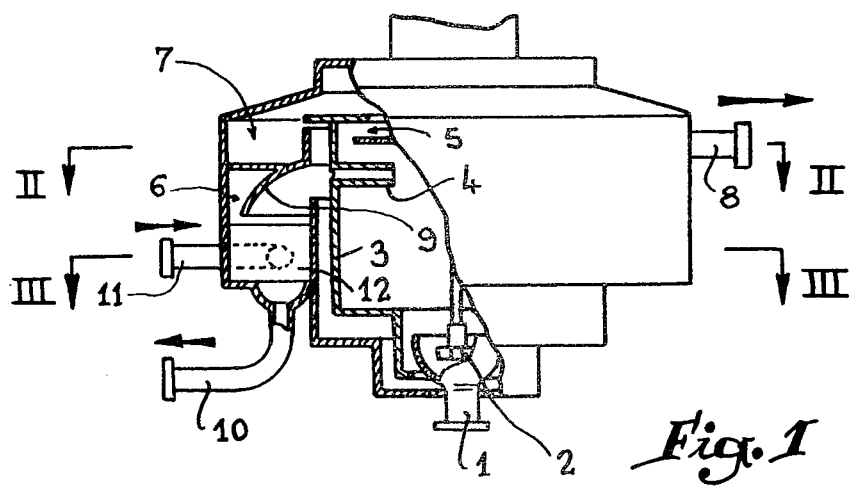
FIG. 1 is an elevation view, with partial section, of a centrifugal machine adapted to establish an installation according to the invention.

Concerning the general arrangement of the centrifugal machines used in the extraction installations of the type envisaged by the invention, it will firstly be recalled that these apparatus are well known in the art and are discribed in Applicants' French Patent Nos. 70,19918 (U.S. Pat. No. 3,756,505) and 73 47196. There is provided a lower inlet 1 (FIG. 1) which may be axial, as shown. This inlet leads to an inner pump 2 which delivers the liquid mixture into a rotating bowl 3 of vertical axis provided with overflow passages 4 and 5, for the light phase and for the heavy phase respectively, the separated liquids which thus leave the bowl in the form of atomized sheets agitated by a high centrifugal speed, being collected in two annular collector spaces 6 and 7. This has only been shown very schematically, as it is well known in the prior art and has nothing to do with the present invention.

The heavy phase collected at the top, in 7, is evacuated through a tangential tube 8 (FIG. 2) which recovers a fraction of the kinetic energy (direction of rotation of the bowl indicated by arrow A) converting it into static pressure to facilitate the flow, as will be more readily understood hereinafter.

Concerning the lower collector space 6 corresponding to the light phase, it firstly comprises a deflector 9 which directs the atomized sheet leaving the passages 4 downwardly. An evacuation pipe 10 leaves from the bottom of this space, whilst a tangential inlet pipe 11 adjacent the pipe 10, but separated therefrom by a partition 12 (FIG. 3) is provided, so that the liquid entering at 11 must rotate by approximately one revolution in the direction of rotation A of the bowl 3 to arrive at the outlet. The bottom of the space 6 is provided with a series of small baffles 13 intended to create eddies in the rotating liquid.

Figure 2:
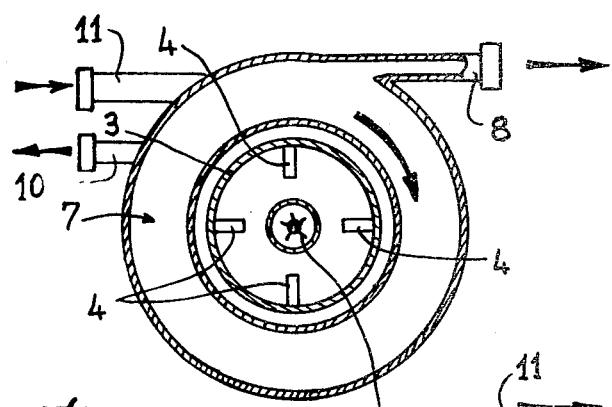
FIGS. 2 and 3 are sections along II—II and III—III (FIG. 1).
Figure 3:
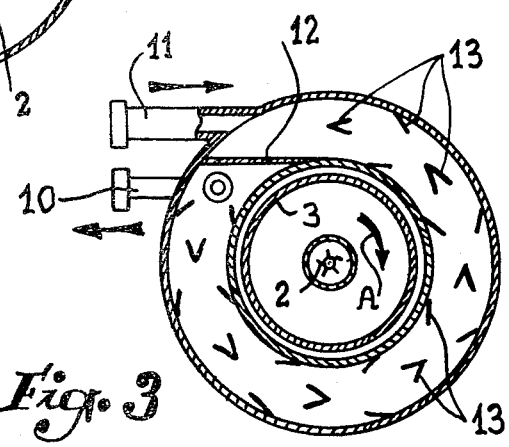
Figure 4:
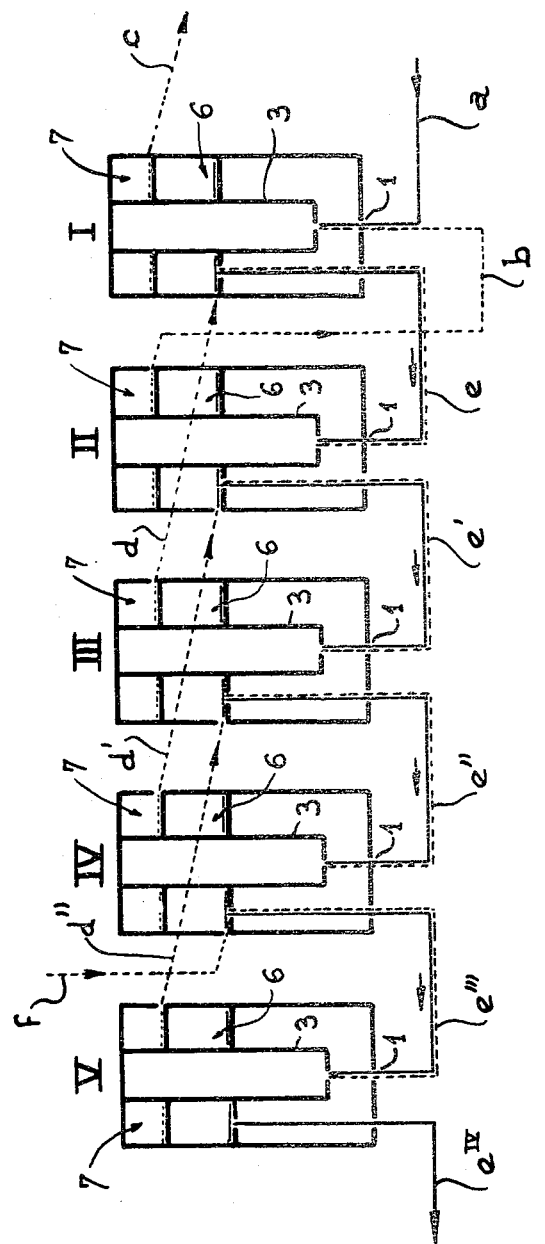
FIG. 4 is a very schematic general view of the installation.

FIG. 4 very schematically shows an installation comprising five machines of the type as shown in FIGS. 1 to 3. To facilitate understanding, the path of the light liquid has been indicated in solid lines and that of the heavy liquid in broken lines.

The light liquid arrives at a in the lower inlet pipe of the first machine from the right (machine I). It mixes with heavy liquid coming via b from the upper collector space (space 7 of FIG. 1) of the second machine II from the right. The mixture thus made is stirred by the pump of I, then is separated on the one hand into a heavy fraction collected in the upper space 7 of this machine and which leaves the installation as indicated at c, on the other hand into a light fraction collected in the lower space 6. The pipe 11 (FIG. 3) of this space 6 simultaneously receives via the inclined pipe d heavy liquid transferred from the third machine III. Due to the divided state of the light liquid which reaches said space, to the deflector 9 which directs it downwardly so that it strikes the heavy liquid and to the baffles 13 which divide the flow, there is an intimate mixing of the two liquids and even the formation of a temporary emulsion of droplets of one liquid in the other, this ensuring an intimate contact. The mixture thus made is evacuated through pipe 10 of machine I and it is sent to the lower inlet 1 of machine II via pipe e (indicated both in solid lines and in broken lines, since a mixture of the two liquids passes therethrough). In this machine II, the mixture is again separated, the heavy liquid (upper space 7) being sent via b to the lower inlet of I, as indicated hereinabove.

Similarly, it is seen that the lower collector space 6 of machine II, which collects the light liquid separated in said machine, also receives heavy liquid which is transferred thereto via inclined pipe d' from the upper collector space 7 of machine IV, the mixture which is thus made in said lower collector space 6 being sent via pipe e' to the lower inlet of machine III.

Similarly, the lower collector space 6 or the machine III receives heavy liquid transferred from the upper collector space 7 of machine V via pipe d", the mixture being sent to the lower inlet of machine IV via pipe e".

On the contrary, the lower collector space 6 of machine IV is directly supplied with heavy liquid via the inlet pipe f of the installation, the mixture again being directed to the inlet of the following machine V via a pipe e'''.

Finally, in the last machine V, supplied from the preceding one, the heavy liquid of the upper space 7 is transferred to machine III, as indicated hereinabove, whilst the light liquid collected at 6 leaves the installation via pipe e'$^v$.

It should be noted that, to avoid sometimes undesirable flows of air or other gas between the machines in question, it may be advantageous if the liquid transfer pipes such as d, d', d" comprise a siphon device. Furthermore, to prolong the intimate contact between the two liquids initially ensured in the lower collector spaces of machines I to IV, baffles may be provided inside the pipes e, e', e", e''' which connect each of these spaces to the inlet 1 of the following machine.

If the whole of the installation is considered, the following may be distinguished:
-two end machines I and II corresponding to the inlet of the light liquid and to the outlet of the heavy liquid (pipes a and c);
-two other end machines IV and V corresponding to the inlet of heavy liquid and to the outlet of the light liquid (pipes f and e'$^v$);
-and a intermediate machine III.

It will be readily appreciated that the intermediate machines such as III comprising the two transfer pipes d and d" may be multiplied.

It will further be noted that there is an effect of mixing of the liquids in the collector spaces 6 and in the pipes e, e', e" and e''' in machines I, II, III and IV, but not in machine V.

The preceding description has been given only by way of example and it in no way limits the domain of the invention, equivalent means being able to replace the means described, without departing from the scope of the invention. The invention is applicable whatever the arrangement of the collector spaces (i.e. the upper collector space could collect the light liquid and the lower space the heavy liquid). The installation may even comprise machines of both types. It would be possible to imagine variants in the transfers from one collector space to the other. It might even be possible to transfer not just one of the liquids, but alternately one, then the other. The transfer pipes might comprise individual mechanical, pneumatic or other pumps, if desired. The outlet and inlet pipes such as 8 and 11 need not be tangential, despite the advantage that this brings, or at least need only be approximately tangential.

What is claimed is:

1. In an installation for contacting a first heavier liquid with a second lighter non-miscible liquid and for centrifugally extracting resulting heavier and lighter phases of the liquids in each machine, the installation including multiple centrifuging machines connected by pipe means to pass the second lighter liquid in series from a first machine through at least one intermediate machine to a last machine, and being connected by pipe means to receive and centrifuge the first liquid in contact with the second liquid while counterflowing the heavier phase substantially from the last machine toward the first machine, each machine having a common inlet to receive both liquid phases and having first and second collector spaces respectively receiving said centrifuged heavier and lighter phases, the improvement comprising each common inlet of all but the first machine being connected by said pipe means to the second lighter phase collector space of the adjacent machine located closer to the first machine;

the heavier phase collector space of all but the first and second machines being connected to discharge into the lighter phase collector space of another machine located beyond said adjacent machine toward the first machine; and the inlet of the first machine being coupled to receive the second lighter liquid and to receive the heavier phase taken from the first collector space of the second machine.

2. In an installation as claimed in claim 1, wherein the installation includes multiple intermediate machines, the heavier phase collector space of all but the first and second machines discharging into the lighter collector space of a non-adjacent machine located in the direction of the first machine, the first heavier liquid being introduced into the installation by inserting it into the lighter phase collector space of the next-to-last machine, the heavier phase being taken from the installation at the heavier phase collector space of the first machine, and the lighter phase being taken from the installation at the lighter phase collector space of the last machine.

3. In an installation as claimed in claim 1, the heavier phase collector spaces of the machines being located higher than the lighter phase collector spaces of the machines, and the heavier phase collector spaces in the machines being coupled for gravity feed to the lighter phase collector spaces in other machines into which they discharge.

4. In an installation as claimed in claim 1, each lighter phase collector space being annular about the axis of centrifuging so that the lighter phase rotates therearound with kinetic energy imparted thereto by centrifuging, and the lighter phase collector space having an outlet disposed to intercept the kinetic energy of the liquid and employ it to assist in transfer of the liquid from the space.

5. In an installation as claimed in claim 4, the annular collector space having an inlet which is disposed tangentially thereof and discharges in the direction of rotation of said lighter phase adjacent to and beyond said outlet, and a partition in the collector space located between said inlet and said outlet and separating them so that liquid in the space must rotate substantially one revolution about said axis prior to discharge through the outlet.

6. In an installation as claimed in claim 5, wherein the lighter phase collector space has baffle means spaced therearound and located to increase the turbulence of liquids rotating therein.

7. In an installation as claimed in claim 1, each machine having a rotating centrifuge bowl receiving liquids from the machine inlet and discharging said phases into said collector spaces, and a baffle surrounding the bowl and separating the discharged phases to fall into the appropriate collector spaces.

8. In an installation as claimed in claim 1, wherein pipes connect the heavier phase collector spaces with said lighter phase collector spaces, and said pipes being formed as siphons where they enter the heavier phase collector spaces to allow passage of liquids but to oppose passage of gases.

9. In an installation as claimed in claim 1, wherein baffles are located in said means transferring liquid phases from said collector spaces operative to create turbulence to increase mixing of the phases.

10. A separator machine for contacting two liquids and centrifugally extracting heavier and lighter phases of the liquids as claimed in claim 6.

* * * * *